United States Patent [19]

Ueda

[11] Patent Number: 4,896,286
[45] Date of Patent: Jan. 23, 1990

[54] FLOATING-POINT ARITHMETIC APPARATUS

[75] Inventor: Katsuhiko Ueda, Osaka, Japan

[73] Assignee: Matsushita Electric Industrial Co., Ltd., Osaka, Japan

[21] Appl. No.: 137,924

[22] Filed: Dec. 28, 1987

[30] Foreign Application Priority Data

Dec. 29, 1986 [JP] Japan ................................ 61-311024

[51] Int. Cl.⁴ ............................................... G06F 7/38
[52] U.S. Cl. .................................................. 364/748
[58] Field of Search ........................................ 364/748

[56] References Cited

U.S. PATENT DOCUMENTS

| | | | |
|---|---|---|---|
| 4,488,252 | 12/1984 | Vassar | 364/748 |
| 4,562,553 | 12/1985 | Mattedi et al. | 364/748 |
| 4,644,490 | 2/1987 | Kobayashi et al. | 364/748 |
| 4,698,771 | 10/1987 | Mills et al. | 364/748 |

OTHER PUBLICATIONS

"An American National Standard; IEEE Standard for Binary Floating-Point Arithmetic" sponsored by Standards Committee of the IEEE Computer Society; approved by IEEE Standards Board & American National Standards Institute; ANSI/IEEE Std. 754—1985.

Primary Examiner—Gary V. Harkcom
Assistant Examiner—Dale M. Shaw
Attorney, Agent, or Firm—Lowe, Price, LeBlanc, Becker & Shur

[57] ABSTRACT

A floating-point arithmetic apparatus includes a first device for matching scales of first and second floating-point data. A second device serves to perform addition and subtraction between outputs from the first device. A third device serves to normalize output from the addition/subtraction device. A fourth device serves to round off output from the third device. A fifth device serves to calculate an absolute value of output from the third device. The fourth device and the fifth device may include a common adder.

6 Claims, 9 Drawing Sheets

FIG. 5

| ROUND OFF MODE | SIGN BIT | LSB | G BIT | R BIT | S BIT | ADDITION DATA | NOTE |
|---|---|---|---|---|---|---|---|
| RN MODE | — | — | 0 | 0 | 0 | 0 | G BIT=0 NO ROUND OFF |
|  | — | — | 0 | 0 | 1 | 0 |  |
|  | — | — | 0 | 1 | 0 | 0 |  |
|  | — | — | 0 | 1 | 1 | 0 |  |
|  | — | — | 1 | 0 | 1 | 1 | G BIT=1 ROUND OFF |
|  | — | — | 1 | 1 | 0 | 1 |  |
|  | — | — | 1 | 1 | 1 | 1 |  |
|  | — | 0 | 1 | 0 | 0 | 0 | MID. LSB=0 |
|  | — | 1 | 1 | 0 | 0 | 1 | MID. LSB=1 |
|  | — | — | 0 | 0 | 0 | 0 | ACCURATE |
| RP MODE | 0 | — | 0 | 0 | 1 | 1 | POSITIVE NUMBER ROUND OFF |
|  | 0 | — | 0 | 1 | 0 | 1 |  |
|  | 0 | — | 0 | 1 | 1 | 1 |  |
|  | 0 | — | 1 | 0 | 0 | 1 |  |
|  | 0 | — | 1 | 0 | 1 | 1 |  |
|  | 0 | — | 1 | 1 | 0 | 1 |  |
|  | 0 | — | 1 | 1 | 1 | 1 |  |
|  | 0 | — | 0 | 0 | 0 | 0 | ACCURATE |
|  | 1 | — | 0 | 0 | 1 | 0 | NEGATIVE NUMBER NO ROUND OFF |
|  | 1 | — | 0 | 1 | 0 | 0 |  |
|  | 1 | — | 0 | 1 | 1 | 0 |  |
|  | 1 | — | 1 | 0 | 0 | 0 |  |
|  | 1 | — | 1 | 0 | 1 | 0 |  |
|  | 1 | — | 1 | 1 | 0 | 0 |  |
|  | 1 | — | 1 | 1 | 1 | 0 |  |
| RM MODE | 1 | — | 0 | 0 | 1 | 1 | NEGATIVE NUMBER ROUND OFF |
|  | 1 | — | 0 | 1 | 0 | 1 |  |
|  | 1 | — | 0 | 1 | 1 | 1 |  |
|  | 1 | — | 1 | 0 | 0 | 1 |  |
|  | 1 | — | 1 | 0 | 1 | 1 |  |
|  | 1 | — | 1 | 1 | 0 | 1 |  |
|  | 1 | — | 1 | 1 | 1 | 1 |  |
|  | 0 | — | 0 | 0 | 0 | 0 | POSITIVE NUMBER NO ROUND OFF |
| RZ MODE | — | — | — | — | — | 0 | NO ROUND OFF |

FIG. 6

| INPUT DATA | | | | | | | | OUTPUT DATA | | | | | | NECESSARY SHIFT NUMBER |
|---|---|---|---|---|---|---|---|---|---|---|---|---|---|---|
| SIGN BIT | $2^1$ | $2^0$ | $2^{-1}$ | $2^{-2}$ | ..... | $2^{-22}$ | $2^{-23}$ | $-2^5$ | $2^4$ | $2^3$ | $2^2$ | $2^1$ | $2^0$ | |
| 0 | 1 | – | – | – | | – | – | 1 | 1 | 1 | 1 | 1 | 1 | 1 RIGHT |
| 0 | 0 | 1 | – | – | | – | – | 0 | 0 | 0 | 0 | 0 | 0 | 0 |
| 0 | 0 | 0 | 1 | – | | – | – | 0 | 0 | 0 | 0 | 0 | 1 | 1 LEFT |
| 0 | 0 | 0 | 0 | 1 | | – | – | 0 | 0 | 0 | 0 | 1 | 0 | 2 LEFT |
| | | | | | .... | | | | | | | | | |
| 0 | 0 | 0 | 0 | 0 | | 1 | 0 | 0 | 1 | 0 | 1 | 1 | 0 | 22 LEFT |
| 0 | 0 | 0 | 0 | 0 | | 0 | 1 | 0 | 1 | 0 | 1 | 1 | 1 | 23 LEFT |
| 0 | 0 | 0 | 0 | 0 | | 0 | 0 | 0 | 0 | 0 | 0 | 0 | 0 | 0 |
| 1 | 1 | 1 | 1 | 1 | | 1 | 1 | 0 | 1 | 0 | 1 | 1 | 1 | 23 LEFT |
| 1 | 1 | 1 | 1 | 1 | | 1 | 0 | 0 | 1 | 0 | 1 | 1 | 0 | 22 LEFT |
| | | | | | .... | | | | | | | | | |
| 1 | 1 | 1 | 1 | 1 | | 0 | 1 | | | | | | | |
| | | | | | .... | | | | | | | | | |
| 1 | 1 | 1 | 1 | 1 | | 0 | 0 | 0 | 0 | 0 | 0 | 1 | 0 | 2 LEFT |
| 1 | 1 | 1 | 1 | 0 | | 0 | 1 | | | | | | | |
| 1 | 1 | 1 | 1 | 0 | | 0 | 0 | 0 | 0 | 0 | 0 | 0 | 1 | 1 LEFT |
| | | | | | .... | | | | | | | | | |
| 1 | 1 | 1 | 0 | 0 | | 0 | 1 | | | | | | | |
| 1 | 1 | 1 | 0 | 0 | | 0 | 0 | 0 | 0 | 0 | 0 | 0 | 0 | 0 |
| 1 | 1 | 0 | 0 | 0 | | 0 | 1 | | | | | | | |
| 1 | 1 | 0 | 0 | 0 | | 0 | 0 | | | | | | | |
| | | | | | .... | | | 1 | 1 | 1 | 1 | 1 | 1 | 1 RIGHT |
| 1 | 0 | 0 | 0 | 0 | | 0 | 1 | | | | | | | |

FIG. 7

| ARITHMETIC MODE | INPUT | | | | OUTPUT | | NOTE |
|---|---|---|---|---|---|---|---|
| | $e_z$ | $e_b$ | $s_1$ | $s_2$ | CPL1 | CPL2 | |
| $N_1 + N_2$ | 0 | 0 | 0 | 0 | 0 | 0 | $f1 + f2'$ |
| | | | 0 | 1 | 0 | 1 | $f1 - f2'$ |
| | | | 1 | 0 | 0 | 1 | $-(f1 - f2')$ |
| | | | 1 | 1 | 0 | 0 | $-(f1 + f2')$ |
| | 0 | 1 | 0 | 0 | 0 | 0 | $f2 + f1'$ |
| | | | 0 | 1 | 1 | 0 | $-(f2 - f1')$ |
| | | | 1 | 0 | 1 | 0 | $f2 - f1'$ |
| | | | 1 | 1 | 0 | 0 | $-(f2 + f1')$ |
| | 1 | — | 0 | 0 | 0 | 0 | $f1 + f2$ |
| | | | 0 | 1 | 0 | 1 | $f1 - f2$ |
| | | | 1 | 0 | 1 | 0 | $-f1 + f2$ |
| | | | 1 | 1 | 0 | 0 | $-(f1 + f2)$ |
| $N_1 - N_2$ | 0 | 0 | 0 | 0 | 0 | 1 | $f1 - f2'$ |
| | | | 0 | 1 | 0 | 0 | $f1 + f2'$ |
| | | | 1 | 0 | 0 | 0 | $-(f1 + f2')$ |
| | | | 1 | 1 | 0 | 1 | $-(f1 - f2')$ |
| | 0 | 1 | 0 | 0 | 1 | 0 | $-(f2 - f1')$ |
| | | | 0 | 1 | 0 | 0 | $f2 + f1'$ |
| | | | 1 | 0 | 0 | 0 | $-(f2 + f1')$ |
| | | | 1 | 1 | 1 | 0 | $f2 - f1'$ |
| | 1 | — | 0 | 0 | 0 | 1 | $f1 - f2$ |
| | | | 0 | 1 | 0 | 0 | $f1 + f2$ |
| | | | 1 | 0 | 0 | 0 | $-(f1 + f2)$ |
| | | | 1 | 1 | 1 | 0 | $-f1 + f2$ |
| $-N_1 + N_2$ | 0 | 0 | 0 | 0 | 0 | 1 | $-(f1 - f2')$ |
| | | | 0 | 1 | 0 | 0 | $-(f1 + f2')$ |
| | | | 1 | 0 | 0 | 0 | $f1 + f2'$ |
| | | | 1 | 1 | 0 | 1 | $f1 - f2'$ |
| | 0 | 1 | 0 | 0 | 1 | 0 | $f2 - f1'$ |
| | | | 0 | 1 | 0 | 0 | $-(f2 + f1')$ |
| | | | 1 | 0 | 0 | 0 | $f2 + f1'$ |
| | | | 1 | 1 | 1 | 0 | $-(f2 - f1')$ |
| | 1 | — | 0 | 0 | 1 | 0 | $-f1 + f2$ |
| | | | 0 | 1 | 0 | 0 | $-(f1 + f2)$ |
| | | | 1 | 0 | 0 | 0 | $f1 + f2$ |
| | | | 1 | 1 | 0 | 1 | $f1 - f2$ |

FIG. 8

| INPUT | | | | | OUTPUT | NOTE |
|---|---|---|---|---|---|---|
| ARITHMETIC MODE | $e_z$ | $s_1$ | $s_2$ | $s_t$ | CPL3 | |
| $N_1 + N_2$ | 0 | – | – | – | 0 | ROUND OFF |
| | 1 | 0 | 0 | – | 0 | ROUND OFF |
| | 1 | 0 | 1 | 0 | 0 | ROUND OFF |
| | 1 | 0 | 1 | 1 | 1 | ABSOLUTE CALCULATION |
| | 1 | 1 | 0 | 0 | 0 | ROUND OFF |
| | 1 | 1 | 0 | 1 | 1 | ABSOLUTE CALCULATION |
| | 1 | 1 | 1 | – | 0 | ROUND OFF |
| $N_1 - N_2$ | 0 | – | – | – | 0 | ROUND OFF |
| | 1 | 0 | 0 | 0 | 0 | ROUND OFF |
| | 1 | 0 | 0 | 1 | 1 | ABSOLUTE CALCULATION |
| | 1 | 0 | 1 | – | 0 | ROUND OFF |
| | 1 | 1 | 0 | – | 0 | ROUND OFF |
| | 1 | 1 | 1 | 0 | 0 | ROUND OFF |
| | 1 | 1 | 1 | 1 | 1 | ABSOLUTE CALCULATION |
| $-N_1 + N_2$ | 0 | – | – | – | 0 | ROUND OFF |
| | 1 | 0 | 0 | 0 | 0 | ROUND OFF |
| | 1 | 0 | 0 | 1 | 1 | ABSOLUTE CALCULATION |
| | 1 | 0 | 1 | – | 0 | ROUND OFF |
| | 1 | 1 | 0 | – | 0 | ROUND OFF |
| | 1 | 1 | 1 | 0 | 0 | ROUND OFF |
| | 1 | 1 | 1 | 1 | 1 | ABSOLUTE CALCULATION |

FIG. 9

| ARITHMETIC MODE | INPUT | | | | | OUTPUT | NOTE |
|---|---|---|---|---|---|---|---|
| | $e_z$ | $e_b$ | $s_1$ | $s_2$ | $s_t$ | $s$ | |
| $N_1 + N_2$ | 0 | 0 | 0 | — | — | 0 | $f1 \pm f2'$ |
| | 0 | 0 | 1 | — | — | 1 | $-(f1 \pm f2')$ |
| | 0 | 1 | — | 0 | — | 0 | $f2 \pm f1'$ |
| | 0 | 1 | — | 1 | — | 1 | $-(f2 \pm f1')$ |
| | 1 | — | 0 | 0 | — | 0 | $f1 + f2$ |
| | 1 | — | 0 | 1 | 0 | 0 | $f1 - f2$ |
| | 1 | — | 0 | 1 | 1 | 1 | $-(f1 - f2)$ |
| | 1 | — | 1 | 0 | 0 | 0 | $-f1 + f2$ |
| | 1 | — | 1 | 0 | 1 | 1 | $-(-f1 + f2)$ |
| | 1 | — | 1 | 1 | — | 1 | $-(f1 + f2)$ |
| $N_1 - N_2$ | 0 | 0 | 0 | — | — | 0 | $f1 \pm f2'$ |
| | 0 | 0 | 1 | — | — | 1 | $-(f1 \pm f2')$ |
| | 0 | 1 | — | 0 | — | 1 | $-(f2 \pm f1')$ |
| | 0 | 1 | — | 1 | — | 0 | $f2 \pm f1'$ |
| | 1 | — | 0 | 0 | 0 | 0 | $f1 - f2$ |
| | 1 | — | 0 | 0 | 1 | 1 | $-(f1 - f2)$ |
| | 1 | — | 0 | 1 | — | 0 | $f1 + f2$ |
| | 1 | — | 1 | 0 | — | 1 | $-(f1 + f2)$ |
| | 1 | — | 1 | 1 | 0 | 0 | $-f1 + f2$ |
| | 1 | — | 1 | 1 | 1 | 1 | $-(-f1 + f2)$ |
| $-N_1 + N_2$ | 0 | 0 | 0 | — | — | 1 | $-(f1 \pm f2')$ |
| | 0 | 0 | 1 | — | — | 0 | $f1 \pm f2'$ |
| | 0 | 1 | — | 0 | — | 0 | $f2 \pm f1'$ |
| | 0 | 1 | — | 1 | — | 1 | $-(f2 \pm f1')$ |
| | 1 | — | 0 | 0 | 0 | 0 | $-f1 + f2$ |
| | 1 | — | 0 | 0 | 1 | 1 | $-(-f1 + f2)$ |
| | 1 | — | 0 | 1 | — | 1 | $-(f1 + f2)$ |
| | 1 | — | 1 | 0 | — | 0 | $f1 + f2$ |
| | 1 | — | 1 | 1 | 0 | 0 | $f1 - f2$ |
| | 1 | — | 1 | 1 | 1 | 1 | $-(f1 - f2)$ |

FIG. 10

| ARITHMETIC MODE | INPUT | | | | | OUTPUT | | | | NOTE |
|---|---|---|---|---|---|---|---|---|---|---|
| | $e_z$ | $e_b$ | $s_1$ | $s_2$ | $s_t$ | CPL1 | CPL2 | CPL3 | s | |
| $N_1 + N_2$ | 0 | 0 | 0 | 0 | – | 0 | 0 | 0 | 0 | $f1 + f2'$ |
| | | | 0 | 1 | – | 0 | 1 | | 0 | $f1 - f2'$ |
| | | | 1 | 0 | – | 0 | 1 | | 1 | $-(f1 - f2')$ |
| | | | 1 | 1 | – | 0 | 0 | | 1 | $-(f1 + f2')$ |
| | 0 | 1 | 0 | 0 | – | 0 | 0 | | 0 | $f2 + f1'$ |
| | | | 0 | 1 | – | 1 | 0 | | 1 | $-(f2 - f1')$ |
| | | | 1 | 0 | – | 1 | 0 | | 0 | $f2 - f1'$ |
| | | | 1 | 1 | – | 0 | 0 | | 1 | $-(f2 + f1')$ |
| | 1 | – | 0 | 0 | – | 0 | 0 | 0 | 0 | $f1 + f2$ |
| | | | 0 | 1 | 0 | 0 | 1 | 0 | 0 | $f1 - f2$ |
| | | | | | 1 | | | 1 | 1 | $-(f1 - f2)$ |
| | | | 1 | 0 | 0 | 1 | 0 | 0 | 0 | $-f1 + f2$ |
| | | | | | 1 | | | 1 | 1 | $-(-f1 + f2)$ |
| | | | 1 | 1 | – | 0 | 0 | 0 | 1 | $-(f1 + f2)$ |
| $N_1 - N_2$ | 0 | 0 | 0 | 0 | – | 0 | 1 | | 0 | $f1 - f2'$ |
| | | | 0 | 1 | – | 0 | 0 | | 0 | $f1 + f2'$ |
| | | | 1 | 0 | – | 0 | 0 | | 1 | $-(f1 + f2')$ |
| | | | 1 | 1 | – | 0 | 1 | | 1 | $-(f1 - f2')$ |
| | 0 | 1 | 0 | 0 | – | 1 | 0 | | 1 | $-(f2 - f1')$ |
| | | | 0 | 1 | – | 0 | 0 | | 0 | $f2 + f1'$ |
| | | | 1 | 0 | – | 0 | 0 | | 1 | $-(f2 + f1')$ |
| | | | 1 | 1 | – | 1 | 0 | | 0 | $f2 - f1'$ |
| | 1 | – | 0 | 0 | 0 | 0 | 1 | 0 | 0 | $f1 - f2$ |
| | | | | | 1 | | | 1 | 1 | $-(f1 - f2)$ |
| | | | 0 | 1 | – | 0 | 0 | 0 | 0 | $f1 + f2$ |
| | | | 1 | 0 | – | 0 | 0 | 0 | 1 | $-(f1 + f2)$ |
| | | | 1 | 1 | 0 | 1 | 0 | 0 | 0 | $-f1 + f2$ |
| | | | | | 1 | | | 1 | 1 | $-(-f1 + f2)$ |
| $-N_1 + N_2$ | 0 | 0 | 0 | 0 | – | 0 | 1 | | 1 | $-(f1 - f2')$ |
| | | | 0 | 1 | – | 0 | 0 | | 1 | $-(f1 + f2')$ |
| | | | 1 | 0 | – | 0 | 0 | | 0 | $f1 + f2'$ |
| | | | 1 | 1 | – | 0 | 1 | | 0 | $f1 - f2'$ |
| | 0 | 1 | 0 | 0 | – | 1 | 0 | | 0 | $f2 - f1'$ |
| | | | 0 | 1 | – | 0 | 0 | | 1 | $-(f2 + f1')$ |
| | | | 1 | 0 | – | 0 | 0 | | 0 | $f2 + f1'$ |
| | | | 1 | 1 | – | 1 | 0 | | 1 | $-(f2 - f1')$ |
| | 1 | – | 0 | 0 | 0 | 1 | 0 | 0 | 0 | $-f1 + f2$ |
| | | | | | 1 | | | 1 | 1 | $-(-f1 + f2)$ |
| | | | 0 | 1 | – | 0 | 0 | 0 | 1 | $-(f1 + f2)$ |
| | | | 1 | 0 | – | 0 | 0 | 0 | 0 | $f1 + f2$ |
| | | | 1 | 1 | 0 | 0 | 1 | 0 | 0 | $f1 - f2$ |
| | | | | | 1 | | | 1 | 1 | $-(f1 - f2)$ |

4,896,286

FLOATING-POINT ARITHMETIC APPARATUS

BACKGROUND OF THE INVENTION

This invention relates to a floating-point arithmetic apparatus for processing floating-point data with a mantissa section expressed in an absolute value.

Conventional method and apparatus for addition or subtraction between two floating-point data tend to cause a low-speed arithmetic as will be described hereinafter.

SUMMARY OF THE INVENTION

It is an object of this invention to provide an apparatus which can perform floating-point arithmetic at a high speed.

It is another object of this invention to provide a simple floating-point arithmetic apparatus.

In a floating-point arithmetic apparatus according to a first aspect of this invention, a first device matches scales of first and second floating-point data. A second device serves to perform addition and subtraction between outputs from the first device. A third device serves to normalize output from the addition/subtraction device. A fourth device serves to round off output from the third device. A fifth device serves to calculate an absolute value of output from the third device.

A floating-point arithmetic apparatus according to a second aspect of this invention handles first and second floating-point data each having an exponent section, a mantissa section expressed in an absolute value, and a sign section representing a sign of the mantissa section. The arithmetic apparatus includes a first device for selecting the greater of the exponent sections of the first and second data and matching scales of the mantissas of the first and second data, and a second device for performing addition and subtraction between mantissa sections of outputs from the first device. A third device serves to normalize a mantissa section of output from the second device and to correct an exponent section of output from the first device. A fourth device serves to round off a mantissa section of output from the third device. When a mantissa section of output from the fourth device overflows, a fifth device normalizes the mantissa section of the output from the fourth device and corrects the exponent section of the output from the third device. A sixth device serves to calculate an absolute value of output from the third device.

A floating-point arithmetic apparatus according to a third aspect of this invention handles first and second floating-point data each having an exponent section, a mantissa section expressed in an absolute value, and a sign section representing a sign of the mantissa section. The arithmetic apparatus includes a first device for subtracting the exponent sections of the first and second data, calculating a difference between the exponent sections of the first and second data, determining which of the exponent sections of the first and second data is greater, and selecting the greater of the exponent sections of the first and second data. A second device selects the mantissa section of one of the first and second data which has the smaller exponent section, and shifts rightward the selected mantissa section by a bit number corresponding to the difference between the exponent sections. A third device selects the mantissa section of one of the first and second data which has the greater exponent section. An addition/subtraction circuit performs addition and subtraction between outputs from the second and third devices. A fourth device controls the second device, the third device, and the addition/subtraction circuit and allows output from the addition/subtraction circuit to be always positive. A fifth device normalizes the output from the addition/subtraction circuit and corrects the greater exponent. A sixth device rounds off a mantissa section of output from the fifth device. A seventh device calculates an absolute value of the mantissa section of the output from the fifth device.

BRIEF DESCRIPTION OF THE DRAWINGS

FIG. 5 is a diagram of the relationship between input data to and output data from the round control circuit of FIG. 1.

FIG. 6 is a diagram of the relationship between input data to and output data from the counter of FIG. 1.

FIG. 7 is a diagram of the relationship between input data and output data in connection with the generation of control signals CPL1 and CPL2 in the control circuit of FIG. 1.

FIG. 8 is a diagram of the relationship between input data and output data in connection with the generation of a control signal CPL3 in the control circuit of FIG. 1.

FIG. 9 is a diagram of the relationship between input data and output data in connection with the generation of a sign bit "s" in the control circuit of FIG. 1.

FIG. 10 is a diagram of the relationship between input data to and output data from the control circuit of FIG. 1.

DESCRIPTION OF THE PREFERRED EMBODIMENT

In IEEE standard "P754", floating-point data N is expressed as:

$$N = (-1)^s \cdot 2^{e-bias} \cdot (1.f)$$

where the character "s" denotes a sign bit; the character "e" denotes an exponent section with a bias; and the character "f" denotes an absolute mantissa section. One feature of this data format is that the mantissa section is expressed by an absolute value. In addition, IEEE standard "P754" prescribes a method of rounding off arithmetic results.

Figure 2:
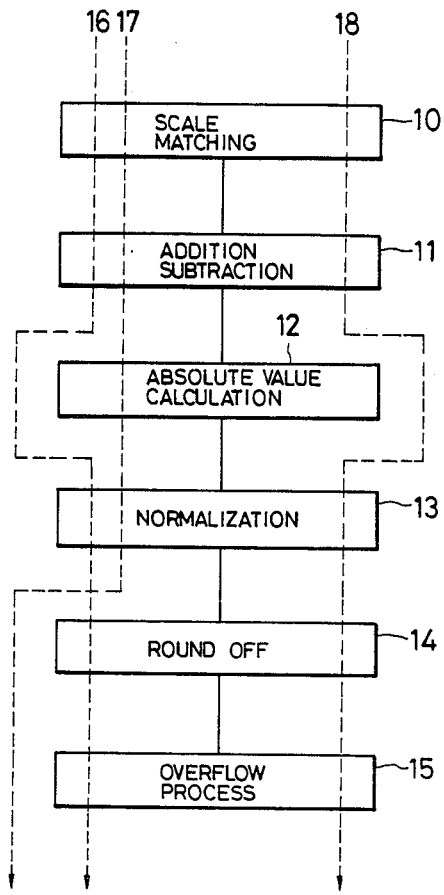
FIG. 2 is a flowchart of a conventional floating-point arithmetic sequence.

Prior to the detailed description of this invention, a conventional method of addition or subtraction between two floating-point data will be described for a better understanding of this invention. As shown in FIG. 2, a conventional method of addition or subtraction between two floating-point data generally requires the following sequential processes: scale matching 10 (which is generally called a binary point alignment process); addition or subtraction 11; absolute value calculation 12; normalization 13; roundoff 14; and overflow process (rightward 1 bit shift) 15. The absolute value calculation 12 and the roundoff 14 require processing times whose lengths increase in proportion to the bit numbers of the mantissas "f". Accordingly, it is usually difficult for the conventional method to perform addition or subtraction between floating-point numbers at a high speed.

Figure 1:
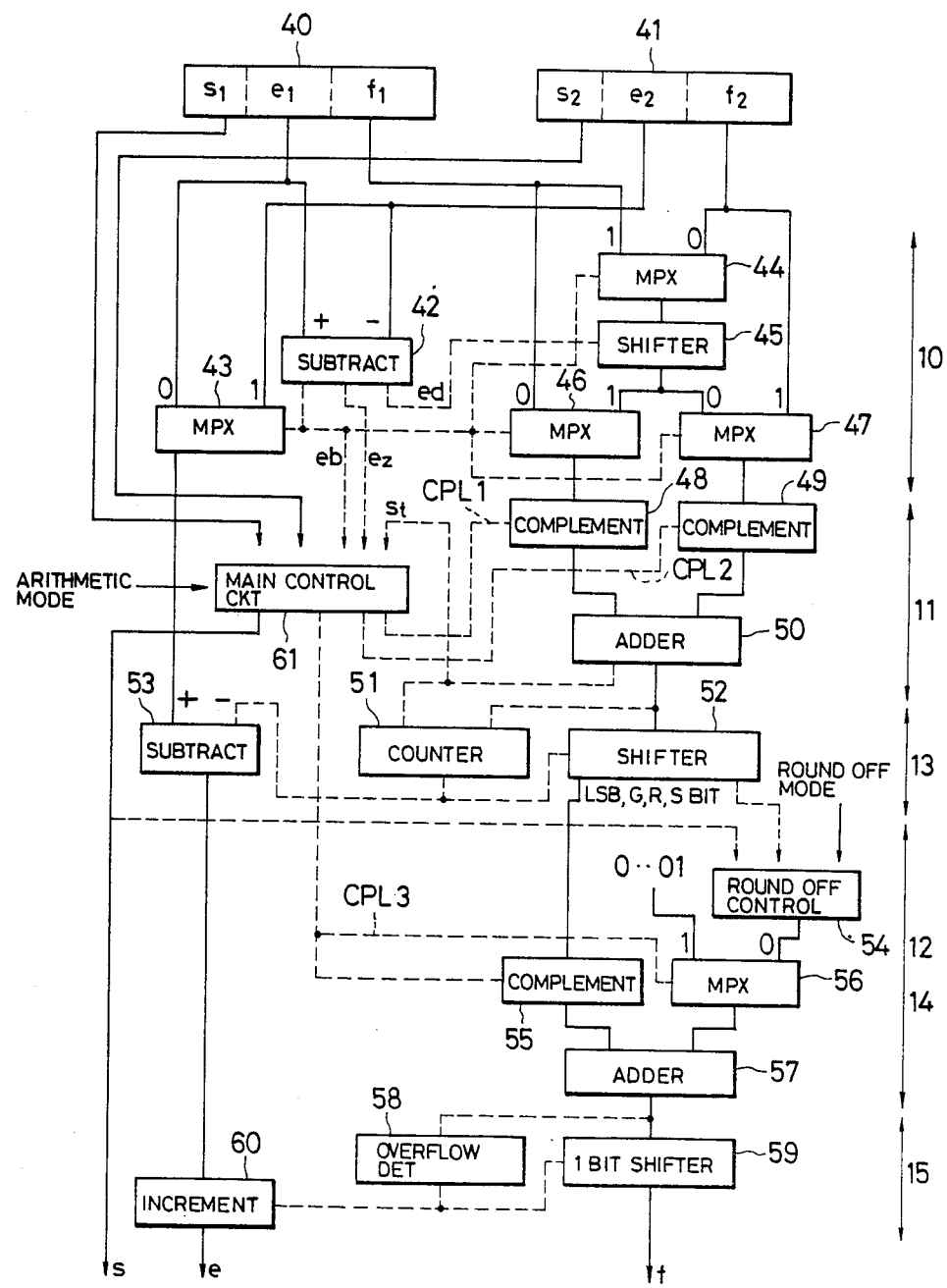
FIG. 1 is a block diagram of a floating-point arithmetic apparatus according to an embodiment of this invention.

FIG. 1 shows a floating-point arithmetic apparatus of this invention, which uses the floating-point format prescribed in IEEE standard "P754". A single precision of arithmetic is assumed to simplify the description. Specifically, two floating-point numbers N1 and N2 are expressed as:

$$N1 = (-1)^{s1} \cdot 2^{e1-127} \cdot (1.f1)$$

$$N2 = (-1)^{s2} \cdot 2^{e2-127} \cdot (1.f2)$$

Figure 3:
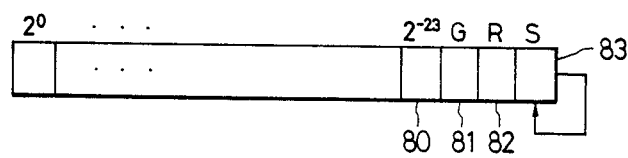
FIG. 3 is a diagram of a guard bit, a round bit, and a sticky bit.

In addition, the floating-point arithmetic apparatus of FIG. 1 uses a roundoff method which is prescribed in IEEE standard "P754". This roundoff method will be simply described hereinafter with reference to FIG. 3. When the mantissa f1 or f2 is shifted right for scale matching, two bits which move out of the scale beyond a bit (referred to as the LSB hereinafter) 80 having a weight of $2^{-23}$ are preserved as a guard bit (referred to as the G bit hereinafter) 81 and a round bit (referred to as the R bit hereinafter) 82, and a bit which shifts right beyond the R bit 82 is preserved as a sticky bit (referred to as the S bit hereinafter) 83 in a form subjected to OR operation. In addition and subtraction, the G bit, the R bit, and the S bit are considered, and bits having weights $2^1 - 2^{-23}$, the G bit, the R bit, and the S bit are calculated. When the result of addition and subtraction is normalized, the G bit 81 and the R bit 82 are shifted into the LSB 80 to increase the accuracy of the mantissa section. IEEE standard "P754" prescribes four roundoff modes, that is, an RN (round to nearest) mode, an RP (round to plus) mode, an RM (round to minus) mode, and an RZ (round to zero) mode.

In the arithmetic apparatus of FIG. 1, an adder 57 performs roundoff. A value added to the LSB in the adder 57 is determined in accordance with a roundoff mode designation signal, the LSB, the G bit, the R bit, and the S bit of the output from a shifter 52, and the sign bit "s" of the final arithmetic result which is one output of a main control circuit 61, as shown in FIG. 5.

Figure 4:
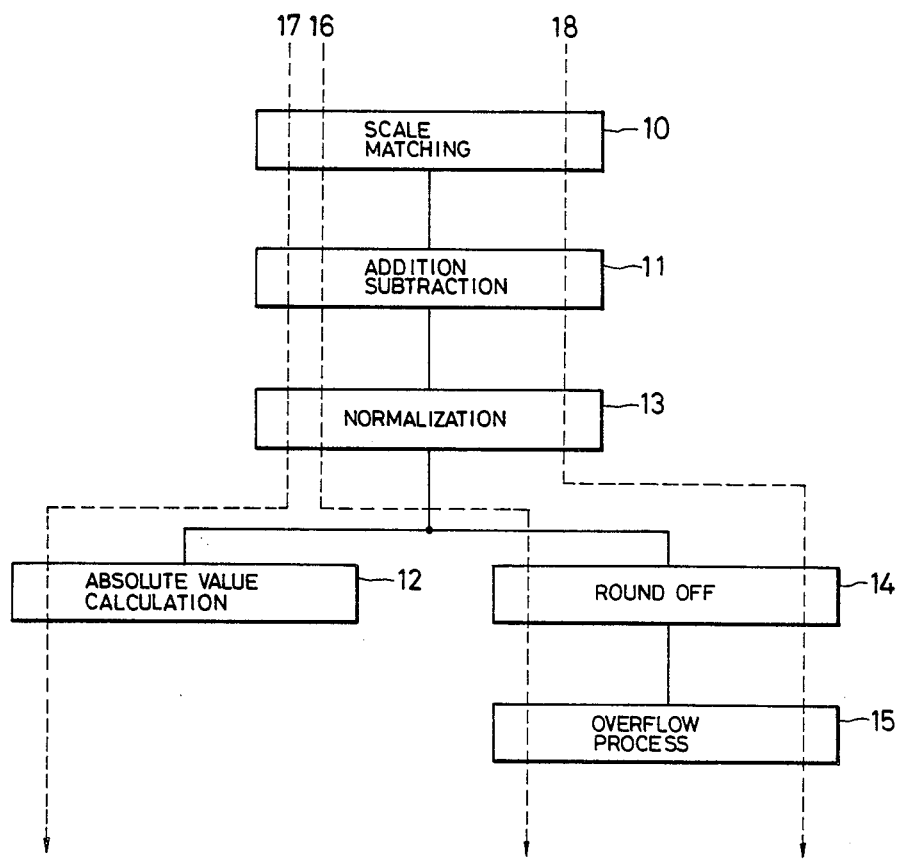
FIG. 4 is a flowchart of a floating-point arithmetic sequence in this invention.

The arithmetic apparatus of FIG. 1 is based on the fact that the conventional floating-point arithmetic sequence can be converted into an arithmetic sequence of FIG. 4. This conversion is possible as proved hereinafter.

The arithmetic sequence of FIG. 2 takes three different paths in respective three cases (1), (2), and (3) as follows.

(1) Addition is Performed with e1=e2

Since e1=e2, it is unnecessary to shift one of the mantissas f1 and f2 in the scale matching process 10. Since the addition process 11 forces the mantissa section to overflow, rightward 1 bit shift in the normalization process 13, the roundoff process 14, and the overflow process 15 are necessary. Accordingly, the whole arithmetic sequence takes a path 16 (see FIG. 2 and also FIG. 4).

(2) Subtraction is Performed with e1=e2

Since e1=e2, it is unnecessary to shift one of the mantissas f1 and f2 in the scale matching process 10. Thus, the G bit, the R bit, and the S bit of the subtraction result are equal to "0" so that the roundoff process 14 and the overflow process 15 are unnecessary. Since the subtraction result is negative in some cases, the absolute value calculation process 12 is necessary. Accordingly, the whole arithmetic sequence takes a path 17 (see FIG. 2 and also FIG. 4).

(3) Exponents e1 and e2 are Unequal

Since the values e1 and e2 are unequal, it is necessary to shift one of the mantissas f1 and f2 rightward in dependence on which of the values e1 and e2 is greater. In the subtraction, since the shifted mantissa is smaller than the other mantissa, it is possible to eliminate the absolute value calculation process 12 by controlling the subtraction so as to make the arithmetic result positive. The right shift of the mantissa sometimes causes one of the G bit, the R bit, and the S bit of the addition or subtraction result to be equal to "1", so that the roundoff process 14 and the overflow process 15 are necessary. Accordingly, the whole arithmetic sequence takes a path 18 (see FIG. 2 and also FIG. 4).

As understood from the previous description, only one of the absolute value calculation process 12 and the roundoff process 14 is performed in any cases.

The positions of the absolute value calculation process 12 and the normalization process 13 are exchangeable in the arithmetic sequence path 17 as proved hereinafter.

Since e1=e2, the bit sequence of the mantissa section which was subjected to the subtraction in the addition and subtraction process 11 can be expressed as:

$$(s, a_1, a_0, a_{-1}, \ldots, a_{-i}, \ldots, a_{-22}, a_{-23}) \tag{1}$$

where the character "s" denotes a sign bit and the character "$a_{-i}$" denotes a bit having a weight of $2^{-i}$. This bit sequence represents the following number "f":

$$f = -s2^2 + \sum_{i=-1}^{23} a_{-i} 2^{-i} \tag{2}$$

In the case where:

$$s = 0 \tag{3}$$

the bit pattern (1) represents a positive number so that the absolute value calculation process 12 does not perform any operation virtually. Accordingly, it is clear that the positions of the absolute value calculation process 12 and the normalization process 13 can be exchanged.

In the case where:

$$(s, a_1, a_0, a_{-1}, \ldots, a_{-m}, a_{-(m+1)}) = (1, 1, 1, 1, \ldots, 1, 0) \tag{4}$$

and where the value "m" is in the range of 0 to 22, the bit pattern (1) represents the following negative number:

$$ff = -1 \cdot 2^2 + \sum_{i=-1}^{m} 1 \cdot 2^{-i} + \sum_{i=m+1}^{23} a_{-i} 2^{-i} \tag{5}$$

so that the absolute value calculation process 12 is required to calculate the complement of "2". The complement process and the normalization process in this case can be performed in the following two different methods or sequences.

(1) First Method Where Normalization Follows Absolute Value Calculation

The number of equation (5) represented by the bit sequence (4) is subjected to the absolute value calculation process by referring to the following equations:

$$f_{f1} = f_f + 2^{-23} \qquad (6)$$
$$= -1 \cdot 2^2 + \sum_{i=-1}^{m} 1 \cdot 2^{-i} + \sum_{i=m+1}^{23} a_{-i} 2^{-i} + 2^{-23}$$
$$= \sum_{i=m+1}^{23} a_{-i} 2^{-i} + 2^{-23}$$

value given by equation (6) is shifted rightward to perform normalization as follows:

(1a) In the case where at least one of the bits $a_{-(m+2)}$ to $a_{-23}$ is different from "0", since the bit $a_{-(m+1)}$ equals "0" as shown by equation (4), $\bar{a}_{-(m+1)}$ equals "–1". The normalization is realized by setting a weight of this bit equal to $2^0$, that is, shifting rightward the bit pattern of equation (6) by (m+1) bits. The result of shift is given as:

$$f_{f1a} = 2^{m+1} \left( \sum_{i=m+1}^{23} a_{-i} 2^{-i} + 2^{-23} \right) \qquad (7)$$

(1b) In the case where all of the bits $a_{-(m+1)}$ to $a_{-23}$ are "0", the right-hand side of equation (6) equals $2^{-m}$. The normalization is realized by a rightward m-bit shift. The result of shift is given as:

$$f_{f1b} = 2^m \cdot 2^{-m} = 2^0 \qquad (8)$$

(2) Second Method Where Normalization Precedes Absolute Value Calculation

The bit pattern of equation (5) is normalized. There are two cases.

(2a) In the case where at least one of the bits $a_{-(m+2)}$ to $a_{-23}$ is different from "0", the bit pattern of equation (4) is shifted leftward by (m+1) bits so that the bit $a_{31\,m}$ will move to the position of the bit $a_1$. The result of shift is given as:

$$f_{f2a} = -1 \cdot 2^2 + \sum_{i=m}^{23} a_{-i} 2^{-(i-m-1)} + \sum_{i=24}^{24+m} 0 \cdot 2^{-(i-m-1)} \qquad (9)$$

The complement of this value with respect to "2" is given as:

$$f_{f2a}' = f_{f2a} + 2^{-23} \qquad (10)$$
$$= -1 \cdot 2^2 + \sum_{i=m}^{23} a_{-i} 2^{-(i-m-1)} +$$
$$\sum_{i=24}^{24+m} 0 \cdot 2^{-(i-m-1)} + 2^{-23}$$
$$= \sum_{i=m+1}^{23} a_{-i} 2^{-(i-m-1)} + 2^{-(22-m)}$$
$$= 2^{m+1} \left( \sum_{i=m+1}^{23} a_{-i} 2^{-i} + 2^{-23} \right)$$

Accordingly, right side of equation (7) = right side of equation (10)  (11)

Equation (11) shows that the position of the absolute value calculation process and the position of the normalization process are exchangeable in the arithmetic sequence.

(2b) In the case where all of the bits $a_{-(m+1)}$ to $a_{-23}$ are "0", the bit pattern of equation (4) is shifted leftward by m bits so that the bit $a_{-m}$ will move to the position of the bit $a_0$. The result of shift is given as:

$$f_{f2b} = -1 \cdot 2^2 + \sum_{i=m-1}^{23} a_{-i} 2^{-(i-m)} + \qquad (12)$$
$$\sum_{i=24}^{23+m} 0 \cdot 2^{-(i-m)}$$
$$= -1 \cdot 2^2 + 1 \cdot 2^1 + 1 \cdot 2^0 + \sum_{i=m+1}^{23+m} 0 \cdot 2^{-(i-m)}$$
$$= -1 \cdot 2^2 + 1 \cdot 2^1 + 1 \cdot 2^0 + \sum_{i=1}^{23} 0 \cdot 2^{-i}$$

The complement of this value with respect to "2" is given as:

$$f_{f2b}' = f_{f2b} + 2^{-23} \qquad (13)$$
$$= -1 \cdot 2^2 + 1 \cdot 2^1 + 1 \cdot 2^0 + \sum_{i=1}^{23} 0 \cdot 2^{-i} + 2^{-23}$$
$$= 2^0$$

Accordingly, right side of equation (8) = right side of equation (13)  (14)

Equation (14) shows that the position of the absolute value calculation process and the position of the normalization process are exchangeable in the arithmetic sequence.

In summary, equations (11) and (14) reveal that, in respect of the bit pattern of equation (4), the position of the absolute value calculation process 12 and the position of the normalization process 13 are exchangeable in the arithmetic sequence.

In the case where:

In the case where:

$$(s, a_1, a_0, a_{-1}, \ldots, a_{-i}, \ldots, a_{-22}, a_{-23}) = \qquad (15)$$
$$(1, 1, 1, 1, \ldots, 1, \ldots, 1, 1)$$

and where a leftward 23 bit shift or a rightward 1 bit shift is required, the position of the absolute value calculation process 12 and the position of the normalization process 13 are similarly proved to be exchangeable in the arithmetic sequence.

In view of the fact that each of the paths 16, 17, and 18 includes only one of the absolute value calculation process 12 and the roundoff process 14 and that the position of the absolute value calculation process 12 and the normalization process 13 are exchangeable, the arithmetic sequence of FIG. 2 is rewritten in a form of FIG. 4. Each of the absolute value calculation process 12 and the roundoff process 14 requires an adder. In the arithmetic sequence of FIG. 4, since the absolute value calculation process 12 and the roundoff process 14 have the same phases, an adder can be used in common in the two processes 12 and 14. The floating-point arithmetic The apparatus of FIG. 1 is designed on the basis of this fact. The processes 10-15 of FIG. 4 correspond to portions of FIG. 1 denoted by the arrows 10-15 respectively.

As shown in FIG. 1, the floating-point arithmetic apparatus includes input registers 40 and 41 which hold two floating-point number data having signs s1 and s2, exponents e1 and e2, and mantissas f1 and f2 respectively. A subtracter 42 subtracts the exponent e2 in the input register 41 from the exponent e1 in the input register 40, and generates an exponent difference signal ed, a borrow signal eb, and an equality signal ez. The exponent difference signal ed represents the absolute value of the difference between the exponents e1 and e2. The borrow signal eb is "0" when the exponent e1 is equal to or greater than the exponent e2, and is "1" when the exponent e1 is smaller than the exponent e2.

A multiplexer 43 selects one of the exponents e1 and e2 in accordance with the borrow signal eb. Specifically, the exponent e1 is selected when the borrow signal eb is "0". The exponent e2 is selected when the borrow signal eb is "1". A multiplexer 44 selects one of the mantissas f1 and f2 in accordance with the borrow signal eb. Specifically, the mantissa f1 is selected when the borrow signal eb is "1". The mantissa f2 is selected when the borrow signal eb is "0". A shifter 45 shifts the output from the multiplexer 44 rightward by a bit number corresponding to the exponent difference ed outputted by the subtracter 42.

A multiplexer 46 selects the mantissa f1 when the borrow signal eb is "0", and selects the output from the shifter 45 when the borrow signal eb is "1". A multiplexer 47 selects the output from the shifter 45 when the borrow signal eb is "0", and selects the mantissa f2 when the borrow signal eb is "1". A complementer 48 calculates the complement of the output from the multiplexer 46 with respect to "1". A complementer 49 calculates the complement of the output from the multiplexer 47 with respect to "1". An adder 50 adds the outputs from the complementers 48 and 49.

A counter 51 derives a number of bits required for the normalization of the output from the adder 50. As shown in FIG. 6, the counter 51 outputs left shift numbers as positive numbers and outputs right shift numbers as negative numbers in the expression of complements with respect to "2". A shifter 52 shifts the output from the adder 50 leftward and rightward in accordance with the output from the counter 51, and thus normalizes the mantissa. A subtracter 53 subtracts the output of the counter 51 from the output of the multiplexer 43, and thus corrects the exponent.

A roundoff control circuit 54 is connected to a main control circuit 61 and the shifter 52. The roundoff control circuit 54 receives a roundoff mode designation signal. A complementer 55 calculates the complement of the output from the shifter 52 with respect to "1". The complementer 55 is connected to the main control circuit 61. A multiplexer 56 selects one of the output from the roundoff control circuit 54 and fixed value data in which only the least significant bit is "1". The multiplexer 56 is connected to the main control circuit 61. An adder 57 adds the outputs from the complementer 55 and the multiplexer 56. An overflow detector 58 senses or checks overflow in the output from the adder 57. A shifter 59 outputs a signal representative of a final mantissa "f", and shifts rightward the output from the adder 57 by 1 bit when the overflow is detected by the overflow detector 58. An incrementer 60 outputs a signal representative of a final exponent "e", and adds "1" to the output from the subtracter 53 when the overflow is detected by the overflow detector 58.

The main control circuit 61 generates control signals CPL1, CPL2, and CPL3 and determines a sign "s" of the final arithmetic result in accordance with an arithmetic mode designation signal, the signs s1 and s2, the outputs eb and ez from the subtracter 42, and the sign bit st outputted from the adder 50. The control signals CPL1 and CPL2 are applied to the complementers 48 and 49 respectively. The control signal CPL3 is applied to the complementer 55 and the multiplexer 56.

Since the mantissa sections f1 and f2 have no bit of a weight equal to $2^0$, "1" is added to each of the left sides of the most significant bits of the outputs from the input registers 40 and 41 and the resulting data are applied to the multiplexers 44, 46, and 47.

The floating-point arithmetic apparatus of FIG. 1 operates as follows:

(a) Scale Matching 10

The subtracter 42 subtracts the exponent e2 in the input register 41 from the exponent e1 in the input register 40, and derives the exponent difference signal ed, the borrow signal eb, and the equality signal ez. The multiplexer 43 selects the larger of the exponents e1 and e2 in accordance with the borrow signal eb. The multiplexer 44 selects one of the mantissas f1 and f2 which corresponds to the smaller of the exponents e1 and e2. Specifically, when the borrow signal eb is "0", the output of the multiplexer 43 represents the exponent e1 and the output of the multiplexer 44 represents the mantissa f2. When the borrow signal eb is "1", the output of the multiplexer 43 represents the exponent e2 and the output of the multiplexer 44 represents the mantissa f1. The shifter 45 shifts the output from the multiplexer 44 rightward by a bit number corresponding to the exponent difference ed. The multiplexer 46 is controlled by the borrow signal eb. When the borrow signal eb is "0", the multiplexer 46 selects the mantissa f1 in the input register 40. When the borrow signal eb is "1", the multiplexer 46 selects the mantissa f1 which was shifted rightward by the shifter 45 by the ed bit or bits. The multiplexer 47 is also controlled by the borrow signal eb. When the borrow signal eb is "1", the multiplexer 46 selects the mantissa f2 in the input register 41. When the borrow signal eb is "0", the multiplexer 46 selects the mantissa f2 which was shifted rightward by the shifter 45 by the ed bit or bits.

(b) Addition and Subtraction 11

The complementers 48 and 49, and the adder 50 performs the addition and subtraction process of the mantissas represented by the outputs of the multiplexers 46 and 47.

In the case where the exponents e1 and e2 are unequal, the complementers 48 and 49 are controlled via the control signals CPL1 and CPL2 so that the number represented by the output from the adder 50 will be positive. The main control circuit 61 generates the control signals CPL1 and CPL2 in accordance with the borrow signal eb, the equality signal ez, the signs s1 and s2, and the externally-supplied arithmetic mode designation signal by referring to the following rules shown in FIG. 7.

In the case where e1>e2(ez=0, eb=0), the output f1 from the multiplexer 46 is greater than the output f2' from the multiplexer 47. The character f2' means the result of a rightward shift of the mantissa f2 for scale matching. When subtraction is finally required, the arithmetic is performed by referring to the following equations:

$$(+f1) + (-f2') = +(f1 - f2')$$
$$(-f1) + (+f2') = -(f1 - f2')$$
$$(+f1) - (+f2') = +(f1 - f2')$$
$$(-f1) - (-f2') = -(f1 - f2')$$
$$-(+f1) + (+f2') = -(f1 - f2')$$
$$-(-f1) + (-f2') = +(f1 - f2')$$

In addition, the main control circuit 61 makes only the control signal CPL2 active and the adder 50 is forced to always output the positive number "f1-f2'".

In the case where e1<e2 (ez=0, eb=1), the output f1' from the multiplexer 46 is smaller than the output f2 from the multiplexer 47. The character f1' means the result of a rightward shift of the mantissa f1 for scale matching. When subtraction is finally required, the arithmetic is performed by referring to the following equations:

$$(+f1') + (-f2) = -(f2 - f1')$$
$$(-f1') + (+f2) = +(f2 - f1')$$
$$(+f1') - (+f2) = -(f2 - f1')$$
$$(-f1') - (-f2) = +(f2 - f1')$$
$$-(+f1') + (+f2) = +(f2 - f1')$$
$$-(-f1') + (-f2) = -(f2 - f1')$$

In addition, the main control circuit 61 makes only the control signal CPL1 active and the adder 50 is forced to always output the positive number "f2-f1'".

In the case where e1=e2 (ez=1, eb=0), it is difficult to determine which of the outputs f1 and f2 from the complementers 48 and 49 is greater from the exponents e1 and e2. When subtraction is finally required, the arithmetic is performed by referring to the following equations:

$$(+f1) + (-f2) = f1 - f2$$
$$(-f1) + (+f2) = f2 - f1$$
$$(+f1) - (+f2) = f1 - f2$$
$$(-f1) - (-f2) = f2 - f1$$
$$-(+f1) + (+f2) = f2 - f1$$
$$-(-f1) + (-f2) = f1 - f2$$

In addition, the main control circuit 61 makes one of the control signals CPL1 and CPL2 active. The output from the adder 50 represents a positive number or a negative number.

(c) Normalization 13

The output from the adder 50 is inputted into the counter 51, and the bit number of shift required for normalization is counted in compliance with the rules of FIG. 6. The shifter 52 normalizes the output from the adder 50 in accordance with the output from the counter 51. The subtracter 53 corrects the exponent.

(d-1) Absolute Value Calculation 12

In the case where ez=1 and the devices 48-50 virtually perform subtraction, since the shifter 45 does not perform a rightward shift, all of the G bit, R bit, and S bit of the output from the adder 50 are "0" and the output from the adder 50 is accurate so that a roundoff process is unnecessary. It should be noted that the output from the adder 50 is sometimes negative. In the case where ez=1 and the sign bit st of the output from the adder 50 is "1", the control signal CPL3 is set to "1" so that the complementer 55 calculates the complement of the output from the shifter 52 with respect to "1" and the multiplexer 56 selects a fixed value (0 ... 01). The complement and the selected fixed value are added by the adder 57 so that the absolute value of the output from the adder 50 is derived. In the case where ez=1 and the sign bit st of the output from the adder 50 is "0", the control signal CPL3 is set to "0" so that the complementer 55 passes the output of the adder 50 as it is and the multiplexer 56 selects the output from the roundoff control circuit 54. The output from the shifter 52 and the selected output from the roundoff control circuit 54 are added by the adder 57. In this case, since all of the G bit, R bit, and S bit are "0" and the roundoff control circuit 54 outputs "0" as shown in FIG. 5, the output of the adder 50 remains virtually unchanged.

(d-2) Roundoff 14

When ez=0, although the output from the adder 50 is always positive, the G bit, R bit, and S bit differ from "0" since the shifter 45 performs a rightward shift. In the case where ez=1 and the devices 48-50 virtually perform addition, the shifter 52 performs a rightward shift so that the G bit of the output from the adder 50 is sometimes "1". In these cases, the control signal CPL3 is set to "0" so that the complementer 55 passes the output of the shifter 52 as it is and the multiplexer 56 selects the output from the roundoff control circuit 54. The output from the adder 50 and the output from the roundoff control circuit 54 are added by the adder 57 so that a roundoff process is performed.

The control signal CPL3 is generated by the main control circuit 61 in accordance with generating conditions of FIG. 8 which relate to the cases (d-1) and (d-2).

(e) Right 1 Bit Shift 15

In the case where the adder 57 performs roundoff, an overflow sometimes occur. When the overflow is detected by the overflow detector 58, the shifter 59 performs a rightward 1 bit shift and the incrementer 60 corrects the exponent.

In accordance with the previously-mentioned processes 10-15, the exponent "e" and the mantissa "f" of the final result are calculated and derived.

The sign bit "s" of the final result is determined as shown in FIG. 9. Specifically, when the exponents e1 and e2 are different, the sign bit "s" is determined in accordance with the sign bits s1 and s2, and the arithmetic mode designation signal. When the exponents e1 and e2 are equal, the sign bit "s" is determined in accordance with the sign bit st of the output from the adder 50.

The rules and the relationships in FIGS. 7-9 are shown together in FIG. 10. The main control circuit 61 is designed so as to satisfy the relationship between the input and the output of FIG. 10.

As described previously, the absolute value calculation and the roundoff are performed exclusively. Accordingly, a single adder 57 is used in common for the absolute value calculation and the roundoff, allowing a simple structure of the arithmetic apparatus. In addition, the exclusive executions of the absolute value calculation and the roundoff enable high-speed arithmetic.

As understood from FIG. 4, a pair of an addition (subtraction) process and a shift process are repeated twice after a scale matching process. Accordingly, the adders 50 and 57 may be composed of a common adding element. In addition, the shifters 45 and 52 may be composed of a common shifting element.

What is claimed is:

1. A floating-point arithmetic apparatus for first and second floating point data each having an exponent section, a mantissa section expressed in an absolute value, and a sign section representing a sign of the mantissa section, the apparatus comprising:

first means for calculating the difference between the exponent sections of the first and second floating point data, determining which of the exponent sections of the first and second floating point data is greater, and selecting the greater exponent section of the first and second floating point data;

second means responsive to an output from the first means for selecting the mantissa section of one of the first and second floating point data which has the smaller exponent section, and shifting rightward the selected mantissa section by a bit number corresponding to the difference between the exponent sections;

third means responsive to the output from the first means for selecting the mantissa section of one of the first and second floating point data which has the greater exponent section;

an arithmetic means for performing addition and subtraction between outputs from the second and third means;

fourth means for normalizing a mantissa section which is an output from said arithmetic means, and correcting the greater exponent section of the first and second floating point data in correspondence with the normalizing;

fifth means for rounding off a mantissa section of an output from the fourth means;

sixth means for calculating an absolute value of the mantissa section of the output from the fourth means;

seventh means for generating a signal representative of a final arithmetic mode on the basis of the sign sections of the first and second floating point data, a result of the determination by the first means about which of the exponent sections of the first and second floating data is greater, and an arithmetic mode designation signal, for outputting the final arithmetic mode signal to said arithmetic means, and for, in cases where the final arithmetic mode corresponds to subtraction and the output from the first means indicates that there is a difference in exponent between the first and second floating point data, instructing said arithmetic means to subtract the output of the second means from the output of the third means;

eighth means for, in cases where the output from the first means represents that there is a difference in exponent between the first and second floating point data, enabling the fifth means to execute its function, for in cases where the output from the first means represents that there is no difference in exponent between the first and second floating point data and the final arithmetic mode corresponds to addition, enabling the fifth means to execute its function, and for, in cases where the output from the first means represents that there is no difference in exponent between the first and second floating point data and the final arithmetic mode corresponds to subtraction, enabling the sixth means to execute its function; and ninth means for determining a sign of a final arithmetic result on the basis of the sign sections of the first and second floating point data, the result of the determination by the first means about which of the exponent sections of the first and second floating point data is greater, the arithmetic mode designation signal, and a sign bit of the output from said arithmetic means.

2. The apparatus of claim 1 further comprising means for, when an output from the fifth means overflows, shifting rightward the output from the fifth means by one bit and correcting an exponent section of an output from the fourth means.

3. The apparatus of claim 1, wherein the said arithmetic means and the sixth means each include an adder.

4. A floating-point arithmetic apparatus for first and second floating point data each having an exponent section, a mantissa section expressed in an absolute value, and a sign section representing a sign of the mantissa section, the apparatus comprising:

first means for calculating the difference between the exponent sections of the first and second floating point data, determining which of the exponent sections of the first and second floating point data is greater, and selecting the greater exponent section of the first and second floating point data;

second means responsive to an output from the first means for selecting the mantissa section of one of the first and second floating point data which has the smaller exponent section, and shifting rightward the selected mantissa section by a bit number corresponding to the difference between the exponent sections;

third means responsive to the output from the first means for selecting the mantissa section of one of the first and second floating point data which has the greater exponent section;

an arithmetic means for performing addition and subtraction between outputs from the second and third means;

fourth means for normalizing a mantissa section which is an output from said arithmetic means, and correcting the greater exponent section of the first and second floating point data in correspondence with the normalizing;

fifth means for rounding off a mantissa section of an output from the fourth means;

sixth means for calculating an absolute value of the mantissa section of the output from the fourth means;

seventh means for generating a signal representative of a final arithmetic mode on the basis of the sign sections of the first and second floating point data, a result of the determination by the firs means about which of the exponent sections of the first and second floating point data is greater, and an arithmetic mode designation signal, for outputting the final arithmetic mode signal to said arithmetic means, and for, in cases where the final arithmetic mode corresponds to subtraction and the output from the first means indicates that there is a difference in exponent between the first and second floating point data, instructing said arithmetic means to subtract the output of the second means from the output of the third means;

eighth means for, in cases where the output from the first means represents that there is a difference in exponent between the first and second floating point data, enabling the fifth means to execute its function, for, in cases where the output from the first means represents that there is no difference in exponent between the first and second floating point data and the final arithmetic mode corresponds to addition, enabling the fifth means to execute its function, and for, in cases where the output from the first means represents that there is no difference in exponent between the first and second floating point data and the final arithmetic mode corresponds to subtraction, enabling the sixth means to execute its function; and ninth means for determining a sign of a final arithmetic result on the basis of the sign sections of the first and second floating point data, the result of the determination by the first means about which of the exponent sections of the first and second floating point data is greater, the arithmetic mode designation signal, and a sign bit of the output from said arithmetic means;

wherein the fifth means and the sixth means each utilize an adding means, the adding means being common to the fifth means and the sixth means.

5. The apparatus of claim 4, further comprising means for, when output from the fifth means overflows, shifting rightward the output from the fifth means by one bit and correcting an exponent section of an output from the fourth means.

6. The apparatus of claim 4, wherein the said arithmetic means and the sixth means each include an adder.

* * * * *